No. 663,013. Patented Dec. 4, 1900.
J. B. CLYNE.
AUTOMATIC LATHE ATTACHMENT.
(Application filed July 17, 1899.)
(No Model.)
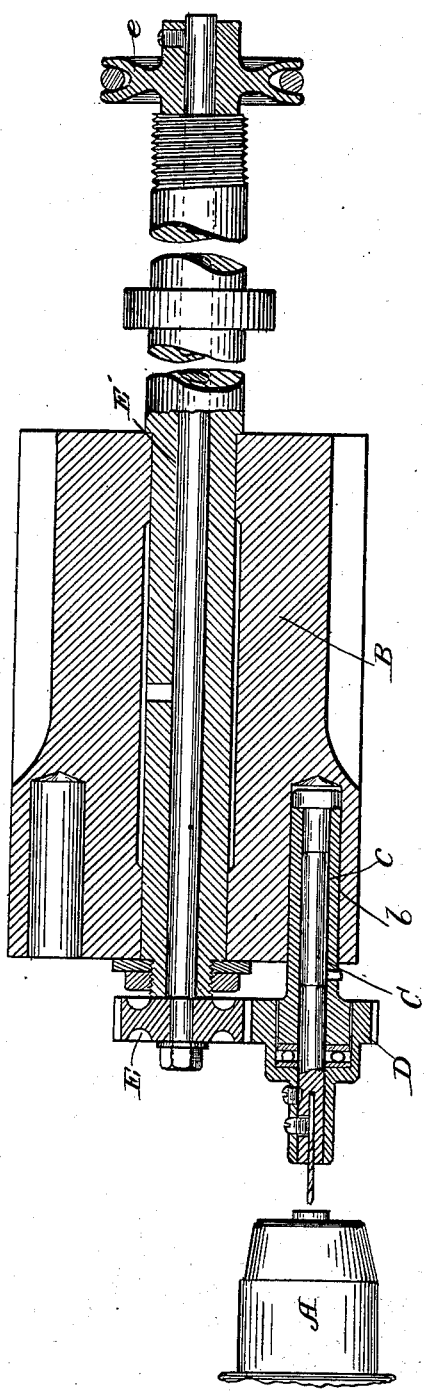
Witnesses,
J. C. Turner
N. E. Merkel
Inventor,
J. B. Clyne
By J. B. Fay
Atty.

UNITED STATES PATENT OFFICE.

JAMES B. CLYNE, OF CLEVELAND, OHIO, ASSIGNOR TO THE CLEVELAND MACHINE SCREW COMPANY, OF SAME PLACE.

AUTOMATIC LATHE ATTACHMENT.

SPECIFICATION forming part of Letters Patent No. 663,013, dated December 4, 1900.

Application filed July 17, 1899. Serial No. 724,096. (No model.)

*To all whom it may concern:*

Be it known that I, JAMES B. CLYNE, a citizen of the United States, and a resident of Cleveland, county of Cuyahoga, and State of Ohio, have invented a new and useful Improvement in Automatic Lathe Attachments, of which the following is a specification, the principle of the invention being herein explained and the best mode in which I have contemplated applying that principle, so as to distinguish it from other inventions.

My invention relates to attachments for automatic lathes, and has for its object the provision of means for drilling the blank with drills which require a much higher rate of speed for proper working than it is practicable to impart to the blank itself while holding the drill stationary.

Said invention consists of means hereinafter fully described.

The annexed drawing and the following description set forth in detail certain mechanism embodying the invention, such disclosed means constituting but one of various mechanical forms in which the principle of the invention may be used.

In said annexed drawing the figure represents an axial section of a turret of a lathe which is automatically and periodically advanced, retracted, and rotated to bring successively different tools into operation upon the metal blank, the end of the lathe headstock being shown in elevation, with certain other parts shown in elevation, said tools, with the exception of the drill, being omitted from the turret and embodying my invention.

It is required, among other operations to be performed upon the blank, to drill a hole of small diameter into the metal blank, which is gripped and rotated in the head-stock A of the lathe.

In one of the tool-holding bores $b$, intermediate of the axis and periphery of the turret B, is placed and suitably secured a bearing or sleeve $c$, in which is journaled a spindle C, suitably secured against longitudinal displacement. A suitable chuck or other means is secured to the outer end of said spindle for securing the drill. A pinion D, of suitable dimension, is also secured to the outer end of said spindle and meshes with a second pinion E, secured to and coaxial with a driving-spindle E', journaled in the turret and having its axis coincident therewith. As shown, the spindle C and the gear D are carried solely by the sleeve $c$, being held through the various connections against longitudinal movement therein. This construction therefore forms a substantially unitary structure having stationary and rotatable parts. This is important for several reasons, among which may be mentioned the fact that the securing of the sleeve in its bore holds the gear D from any tendency of becoming disengaged from the pinion E, and yet allows of such a disengagement whenever desired by a simple removal of the sleeve from the bore, the entire unitary structure being bodily removable from the bore $b$, and without disturbing the position of the pinion E on its spindle or disengaging any other attachments carried by the turret. Suitable means, such as a sheave $e$, are secured to said spindle, whereby it may be driven independently of the turret. The drill may hence be driven by the gearing intermediate of its spindle and the driving-spindle at the desired speed.

In operation the turret is periodically advanced, retracted, and rotated, as is usual in this class of machines, one such advance movement causing the rapidly-rotating drill to advance and perform its function.

The rotation of the drill may be continuous or suitable mechanism may be employed to rotate it at such times only as it is advanced to perform its function, mechanism for the purpose being well known by those skilled in the art.

Other modes of applying the principle of my invention may be employed instead of the one explained, change being made as regards the mechanism herein disclosed, provided the means covered by any one of the following claims be employed.

I therefore particularly point out and distinctly claim as my invention—

1. The combination of a turret having a plurality of tool-holding bores, a spindle journaled in said turret and having its axis coincident with the turret-axis, means for driving said spindle independently of said turret, a sleeve seated in and removable from one of said tool-holding bores, a spindle mounted in said sleeve, having its axis parallel with said turret-axis and having a gear secured to its outer end, and a pinion secured to the outer end of said first-named spindle meshing with said gear, said sleeve, spindle and gear being removable bodily as a unitary structure, without disturbing the position of said pinion, substantially as set forth.

2. The combination of a turret having a plurality of tool-holding bores located equidistantly from its axis, a spindle journaled in said turret and having its axis coincident with the turret-axis and provided with a driving-pulley formed or secured thereon, a sleeve seated in and removable from one of said tool-holding bores, a spindle mounted in said sleeve, having its axis parallel with said turret-axis and having a gear secured to its outer end, a pinion secured to said first-named spindle meshing with said gear, and a tool-holder operatively connected with or secured to said last-named spindle, said sleeve, spindle and gear being removable bodily as a unitary structure without disturbing the position of said pinion, substantially as set forth.

3. The combination with a rotating spindle, having a pinion at one end; and a turret mounted axially to freely rotate thereon, and having tool-holding-bores; of a spindle-carrying sleeve removably secured in one of said bores, said sleeve forming the sole support for a spindle and a gear for driving said spindle, said sleeve, spindle and gear forming a substantially unitary structure and removable bodily from said bore, said gear and said pinion having normally a coöperating relationship which is disengaged by the removal of said sleeve, substantially as described.

4. The combination of the turret B, the spindle E' journaled in and rotatable independently of said turret, the pinion E secured to said spindle, the spindle C journaled in said turret and provided with the driving-gear D meshing with pinion E, the spindle C and gear D being removable bodily as a unitary structure, without disturbing the position of the pinion E, substantially as set forth.

Signed by me this 8th day of July, 1899.

J. B. CLYNE.

Attest:
   D. T. DAVIES,
   A. E. MERKEL.